United States Patent [19]

Nelson

[11] Patent Number: 4,812,260

[45] Date of Patent: Mar. 14, 1989

[54] PROCESS FOR PRODUCTION OF MINERAL DISPERSIONS

[75] Inventor: Lawrence L. Nelson, Wilmington, Del.

[73] Assignee: Hercules Incorporated, Wilmington, Del.

[21] Appl. No.: 27,571

[22] Filed: Mar. 19, 1987

[51] Int. Cl.$^4$ .................. C04B 20/06; C04B 31/22; C04B 31/26; C01B 33/24
[52] U.S. Cl. .................. 252/378 R; 106/DIG. 2; 423/331; 423/112; 501/148; 501/149
[58] Field of Search .............. 252/378 R, 378 P; 423/331, 112; 106/DIG. 2, DIG. 3; 501/149

[56] References Cited

U.S. PATENT DOCUMENTS

| | | | |
|---|---|---|---|
| 3,325,340 | 6/1967 | Walker | 106/DIG. 3 |
| 3,356,611 | 12/1967 | Walker et al. | 252/378 R |
| 4,391,733 | 7/1983 | Lamar et al. | 252/378 R |
| 4,391,734 | 7/1983 | Lamar et al. | 252/378 R |
| 4,425,465 | 1/1984 | Padget et al. | 106/DIG. 3 |
| 4,539,046 | 9/1985 | McAloon et al. | 106/DIG. 3 |
| 4,608,303 | 8/1986 | Ballard et al. | 106/74 |

Primary Examiner—Gary P. Straub
Attorney, Agent, or Firm—Mark Goldberg; Marion C. Staves

[57] ABSTRACT

Disclosed is an improved process for producing dispersions of vermiculite ore particles by intercalating organo-cation salts into the vermiculite structure under shearing conditions to delaminate the ore and reduce particle size in one step.

14 Claims, No Drawings

PROCESS FOR PRODUCTION OF MINERAL DISPERSIONS

FIELD OF THE INVENTION

This invention relates to an improved process for the production of aqueous dispersions of vermiculite particles. In particular, it relates to an improved process for producing aqueous dispersions of vermiculite particles wherein the number of processing steps required to prepare a dispersion of vermiculite ore particles is reduced. More specifically, the invention concerns an improved process for producing dispersions of vermiculite ore particles by intercalating organo-cation salts into the vermiculite structure under shearing conditions to delaminate the ore and reduce particle size in one step.

BACKGROUND OF THE INVENTION

It is known that aqueous suspensions of swollen vermiculite ore particles can be prepared by substituting monovalent inorganic cations such as $Li^+$ or $Na^+$ for exchangeable cations retained by the ore, particularly $Mg^{2+}$ cations, followed by a subsequent step of aqueous washing to remove excess salt and effect macroscopic ore particle swelling. It is also known to employ a third step of introducing mechanical shearing action to the swollen ore particles in water to delaminate the vermiculite structure and to produce an aqueous dispersion of tiny particles or platelets of vermiculite known as vermiculite lamellae. Vermiculite lamellae or platelets can be further characterized as having a particle size typically less than 200 microns, preferably less than 50 microns, and having one dimension that is small compared to the other two dimensions with an aspect ratio (i.e., length or breadth divided by thickness) of at least 10, preferably at least 100 and more preferably at least 1,000, for example, 10,000.

For $Li^+$ exchanged vermiculite ores, sufficient ore swelling occurs in the subsequent washing step such that application of a shearing action to the swollen ore particles reduces platelet dimensions to less than approximately 50 microns, thereby producing vermiculite lamellae of a preferable size for the fabrication of films and coatings. A process as such is disclosed in U.S. Pat. No. 3,325,340.

Salts of lithium have been preferred, as set forth above, due to the cation's capability of causing vermiculite ore to swell during the subsequent washing step prior to a shearing step such that vermiculite lamellae of the desired dimensions are produced. However, lithium salts are expensive, relative to other available inorganic salts.

Sodium salts, therefore, are the most common salt used in the treatment of vermiculite particles due to its low cost, availability and lack of environmental concerns. $Na^+$ exchanged ores, however, lack the swelling potential of $Li^+$ exchanged ores, and thus, are typically replaced by an organo-cation in a second exchange step, followed by a second aqueous washing step to swell the vermiculite ore to an adequate degree, preferably at least twice its original volume, and then subjected to a shearing action to delaminate the swollen ore particles and to produce vermiculite lamellae of a preferred size of less than 50 microns.

Such a process, as set forth above, is disclosed in U.S. Pat. No. 4,608,303 and U.K. Pat. No. 1,593,382. In this process, $Na^+$ exchanged vermiculite ores are contacted with an aqueous organo-cation solution wherein organo-cation salts are intercalated into the vermiculite structure and exchanged for the $Na^+$ cations. For example, in U.K. Pat. No. 1,593,382, $Na^+$ exchanged vermiculite ore is contacted with aqueous solution of butylammonium chloride in a second exchange step to effect ore swelling in a subsequent aqueous washing step followed by application of a shearing action to delaminate the swollen ore particles.

It is preferred, in such processes, to perform the second exchange step wherein the concentration of the organo-cation in aqueous solution is higher than that of exchangeable ions in the $Na^+$ exchanged vermiculite ore. Typically, molar ratios of 1:1 to 12:1 organo-cation to $Na^+$ exchangeable ions in the ore can be employed.

In processes such as disclosed in U.S. Pat. No. 4,608,303 and U.K. No. 1,593,382, a swelling step subsequent to the step of contacting the $Na^+$ exchanged vermiculite ore with organo-cations wherein the organo-cation intercalated ore is subjected to aqueous washing prior to subjecting the ore particles to a shearing action is crucial for the production of vermiculite lamellae of the desired size. It has been preferred to allow the swelling of the ore to proceed to at least four times its original volume, and in some aspects, six times the ore's original volume before shearing.

The swelling step, however, necessarily complicates the process of producing vermiculite lamellae with desired dimensions, and provides for the added production costs of equipment, and labor. Production time is also increased. Therefore, it is an object of this invention to provide an improved process for producing suspensions of vermiculite lamellae having dimensions of less than 200 microns, preferably less than 50 microns, by the elimination of separate washing and ore swelling steps.

SUMMARY OF THE INVENTION

We have now found, contrary to the teachings of the prior art, that organo-cation intercalated vermiculite ore can be delaminated to produce dispersions of vermiculite lamellae with particle size of less than 200 microns, and preferably less than 50 microns, in one step, thereby, eliminating the need for separate washing and ore swelling steps. Further, the invention herein not only has the advantage and novelty over prior art in that fewer steps are required to prepare dispersions of vermiculite lamellae of a desired size, but that suspensions of vermiculite ore intercalated with organo-cations are employed wherein the concentration of the organo-cations can be less than that of exchangeable $Na^+$ cations in the vermiculite ore, therein further reducing production costs.

Accordingly, disclosed is a process for the production of an aqueous dispersion of vermiculite ore particles comprising the steps of: (1) contacting the vermiculite ore with an aqueous solution of at least one salt of a monovalent inorganic cation followed by an aqueous washing to remove excess salt, therein producing an aqueous suspension of vermiculite ore particles, then (2) delaminating the vermiculite ore particles by contacting the particles in the aqueous suspension from step (1) with an organo-cation solution while simultaneously subjecting the suspension to a shearing action until a dispersion containing vermiculite particles having dimensions less than 200 microns, preferably less than 50 microns, is produced.

The invention is further illustrated by the following detailed description.

DETAILED DESCRIPTION OF THE INVENTION

The term "vermiculite" used herein refers to all materials known mineralogically or commercially as vermiculite, and minerals consisting wholly or largely of vermiculite including minerals of a mixed-layer type (phyllosilicates) containing vermiculite layers as a constituent such as hydrobiotites and chlorite-vermiculites, and which can be delaminated in the same or similar manner as vermiculite. While vermiculite is the preferred layer mineral, other layer minerals may be used including montmorillonite, kaolinite and clays comprising sepiolite, kaolinite, and other layer silicate minerals which can be delaminated to produce lamellae or plate-like particles.

In step (1) of the process, an aqueous suspension of vermiculite particles is prepared by contacting vermiculite ore particles with a concentrated salt solution, preferably a sodium salt solution, and gently agitating the mixture for a time sufficient to allow penetration of the salt solution within flakes of vermiculite particles, thereby exchanging $Na^+$ ions with exchangeable material within the vermiculite ore. The time may vary, depending on the size of the particles and the batch of vermiculite being treated, from about one hour to in excess of several days. The salt treated vermiculite ore is then subjected to an aqueous washing until salt which has not penetrated the particle structure or the amount in excess of exchangeable ions in the ore has been removed.

It is preferred to use an excess molar concentration of $Na^+$ cations in the aqueous solution to that of exchangeable ions in the vermiculite ore to insure an acceptable rate of exchange.

Sodium chloride is preferably the salt which is used in treatment of vermiculite particles due mainly to its availability and low cost.

The concentration of vermiculite ore in the suspension may suitably be in the range from about 1% to about 70%, preferably in the range from about 10% to about 30% by weight of vermiculite based on the suspension.

The exchange reaction may be carried out at a variety of temperatures, typically at temperatures above ambient. It is preferable, however, to reflux the aqueous salt solution with the ore.

In step (2) of the process wherein $Na^+$ exchanged vermiculite ores are contacted with an aqueous organo-cation solution and organo-cation salts are exchanged for $Na^+$ cations, the ratio of molar concentration of the organo-cation in the aqueous solution to that of exchangeable $Na^+$ cations in the ore is less than about 3.5:1, preferably in the range between about 1:1 to about 0.2:1. However, molar ratios outside this range may be applicable under different reaction conditions depending upon, for example, differing solids loading.

Organo-cation salts known from prior art to exfoliate vermiculite can be used in this invention. For example, organo-cation salts which are useful in the practice of this invention include salts of ammonium, phosphonium and sulphonium cations. The organic group portion of these cations may be polymerizable or non-polymerizable, substituted or non-substituted, saturated or unsaturated, aliphatic chains, polyoxyethylene chains or aromatic or heterocyclic rings or any combination of two or more of these substituents. Examples of such organo-cations are n-butylammonium, iso-butylammonium, propylammonium, iso-amylammonium, crotyltriethylammonium, allylammonium, methacryloxyethyltrimethylammonium, 3-acryloxyneopentyltrimethylammonium, 2-methacryloxyethyl-t-butylammonium, diallyammonium, diallyldimethylammonium, allyldimethylsulfonium, methacrylamidopropyltrimethylammonium, acrylamidopropyltrimethylammonium, butenyltrimethylammonium, vinylpyridinium ions such as N-methyl-2-vinylpyridinium, vinylbenzyldimethylsulfonium, vinylbenzyltrimethylammonium, 2,3-epoxypropyltrimethylammonium, triethylvinylphosphonium, tributylvinylphosphonium, -ammonium- -butyrolactone, glycidyltrimethylammonium, 1-methyl-1-tert-butylaziridinium, and 1-ethyl-1,3,3-trimethyl azetidinum.

Of the various organo-cation salts capable of exfoliating vermiculite, the most effective are salts of alkylammonium compounds having between 3 and 6 carbon atoms included in each alkyl group, especially those of allylammonium, n-butylammonium, iso-butylammonium, propylammonium and iso-amylammonium. Also effective are solutions of amino-acids, such as lysine or ornithine, in the cationic form.

However, other chemical substances capable of exfoliating vermiculite may be employed as additives to the suspension of vermiculite ore particles from step (1), in place of, or as adjuvants to the organo-cation salt solutions, e.g., alkali metal chlorides such as lithium, or in combination with the aforementioned organo-cationic salts.

The anions in the salts of lithium, sodium or organo-cationic salts are preferably inert anions commonly found in stable salts of these cations, for example, halide ions, and preferably chloride.

While contacting the aqueous suspension of vermiculite ore particles from step (1) with the organo-cation solution in step (2), the vermiculite ore particles are delaminated by simultaneously subjecting the suspension of organo-cation exchanged ore particles to a shearing force such as a rotary paddle, cowles blade or by means of some other shearing devices known in the art. A colloid mill or similar type of shearing macerator may also be employed during this step of the invention, including a Waring blender or a macerator of the type similar to those used for domestic purposes. A shearing force may also be imparted by suitable vibratory treatment, for example, ultrasonic agitation of the suspension. Alternatively, delamination can be accomplished in a process involving two or more shearing steps wherein a low shearing action is initially applied followed by a subsequent step of higher shearing action application.

The object of the delamination step is to produce a dispersion of vermiculite lamellae or platelets having particle size typically less than 200 microns, preferably less than 50 microns, and having one dimension much smaller than the other two with a preferable thickness of less than about 0.5 microns, more preferably less than about 0.05 microns, and having an aspect ratio of at least 10, preferably at least 100, and more preferably at least 1,000, for example 10,000. Thus, shearing can be applied for the minimum time necessary to achieve a dispersion containing particles of the aforesaid preferred dimensions. However, a vigorous grinding action or shearing action which would ultimately reduce the vermiculite particles to approximately three dimension equality is non-desirable.

Step (2) of the process, delamination of the vermiculite ore particles, may be carried out at different temperatures, usually above ambient and preferably reflux temperatures.

Dispersions of vermiculite lamellae can be used, for example, to prepare strong, flexible heat resistant films and coatings by depositing the vermiculite lamellae on surfaces of various shapes and sizes and removing water from the vermiculite particles. Deposition of the vermiculite lamellae can be accomplished by any casting methods known in the art, or electrophoretic methods of depositing vermiculite lamellae from dispersions thereof to form films and coatings may also be employed. Such films and coatings may be used, for example, as refractory-facing materials, fireproof packaging materials, thermal insulation materials, materials for gasket fabrication, and electrical insulating materials.

The following examples illustrate specific processes for the production of vermiculite suspensions according to the invention. It is to be understood that the invention is not in anyway limited thereto.

EXAMPLE I

Control

A 10% by weight suspension of vermiculite ore is refluxed in a saturated sodium chloride solution for four hours, cooled to room temperature, and filtered. The filtrate is then washed with distilled water (by decantation), and air dried to a damp solid. The level of $Na^+$ exchange capacity for various vermiculite ores is summarized in Table I.

TABLE I

| $Na^+$ Exchange Capacity of Vermiculite Ore | |
|---|---|
| Ore Grade (ASTM Material Designation C-516) | Milliequivalents $Na^+$/ 100 grms |
| 2 | 93 |
| 3 | 87 |
| 4 | 88 |
| 5 | 78 |

300 grams of the $Na^+$ exchanged grade 4 vermiculite ore is heated to 80° C. in 1.5 liters of 2M allylammonium chloride (ACC) (ACC/$Na^+$ molar ratio of 11.4:1) for four hours using a paddle stirrer for agitation, cooled to room temperature, then washed with distilled water (by decantation), and then diluted to a 10% by weight solids suspension. The ore is permitted to swell to a sixfold increase in volume, then a shearing action is applied to the suspension for two hours using a commercial blender. The resulting dispersion of vermiculite ore particles is then sieved to remove particles greater than 53 microns in size (90% conversion to less than 53 microns in size). After the dispersion is diluted to 2 weight percent solids, a fim is cast and the water evaporated to yield a sheet with a thickness of 3 mils, which exhibits a tensile strength of 1290 psi, a modulus of 190 kpsi, and an elongation of 3.3%.

EXAMPLE II

To demonstrate that delamination is most effective at organo-cation/$Na^+$ molar ratios between approximately 2:1 to approximately 0.2:1, the following experiments are performed.

A 20 weight percent suspension of the garde 4 $Na^+$ exchanged ore (see, Example I) is heated to 80° C. in an aqueous solution of allylammonium chloride (ACC) for four hours using a paddle type stirrer, then cooled to room temperature. The organo-cation exchanged ore is then allowed to settle and volume of the ore determined. The expansion in ore volume is calculated as the volume the unwashed allylammonium exchanged ore occupies minus the volume the $Na^+$ exchanged ore occupies divided by the volume of the $Na^+$ exchanged ore. The change in organo-cation exchanged ore volume as the molar ratio of allylammonium chloride (ACC) in the aqueous solution to $Na^+$ in the ore is varied from 12.5:1 to 0.1:1 is displayed in the following table.

| Volume Expansion | |
|---|---|
| Milliequivalents ACC/ Milliequivalents $Na^+$ | Volume Expansion (%) |
| 12.5 | 0 |
| 6.3 | 29 |
| 3.1 | 98 |
| 1.6 | 260 |
| 0.8 | 340 |
| 0.4 | 340 |
| 0.2 | 15 |
| 0.1 | 0 |

EXAMPLE III

Example II is repeated using propyl ammonium chloride (PAC). The results are summarized in the following table:

| Volume Expansion | |
|---|---|
| Milliequivalents PAC/ Milliequivalents $Na^+$ | Volume Expansion (%) |
| 12.5 | 0 |
| 6.3 | 0 |
| 3.1 | 70 |
| 1.6 | 490 |
| 0.8 | 350 |
| 0.4 | 400 |

EXAMPLE IV

To demonstrate that delamination of vermiculite ore pursuant to the instant invention is not restricted to ore size, the following experiments are performed.

Example II is repeated except that the grade 4 $Na^+$ exchanged vermiculite ore is replaced by grades 2, 3 or 5 $Na^+$ exchanged ores and the molar ratio of allylammonium chloride to $Na^+$ maintained at 0.7:1. All of the ores swell to at least threefold in volume.

EXAMPLE V

The following example demonstrates the instant invention whereby an organo-cation/$Na^+$ molar ratio within the preferred range is maintained and the separate steps of ore washing and swelling subsequent to organo-cation exchange is eliminated in preparation of dispersions of vermiculite lamellae.

100 grams of grade 4 $Na^+$ exchanged vermiculite ore is suspended in 500 ml. of a 0.125M aqueous solution of allylammonium chloride (ACC/$Na^+$ molar ratio of 0.7:1). The dispersion is heated to 80° C. for four hours while simultaneously applying a shearing action via a cowles blade at 2500 rpm. The dispersion is then cooled, diluted with distilled water and sieved to remove materials greater than 38 microns in size (70% conversion to less than 38 microns in size). The resulting dispersion is diluted to 2 weight percent solids and a film cast. Evaporation of the water produces a film 2 mils thick with a tensile strength of 1570 psi, a modulus of 300 kpsi, and a elongation of 4.3%.

EXAMPLE VI

This example further demonstrates the instant invention whereby the separate steps of washing and ore swelling are eliminated in the preparation of dispersions of vermiculite lamellae used to form films.

Example V is repeated except that grade 4 $Na^+$ exchanged vermiculite ore is replaced by grade 3 $Na^+$ exchanged ore and the molar ratio of allylammonium chloride (ACC) to $Na^+$ is varied from 0 to about 3.0:1. After sieving to remove particles larger than 38 microns in size, the resulting dispersions are diluted to 2 weight percent solids and respective films cast. Evaporation of water produces films having properties which are summarized in the following table:

Effect of ACC/$Na^+$ Mole Ratio on Film Properties

| ACC/$Na^+$ Mole Ratio | Particle Size Conversion to Less than 38 Microns (%) | Tensile Strength (psi) | Film Modulus (kpsi) | Elongation (%) |
|---|---|---|---|---|
| 0 | 46 | 708 | 580 | 0.2 |
| 0.2 | 67 | 1200 | 670 | 0.8 |
| 0.5 | 81 | 1560 | 560 | 1.8 |
| 0.7 | 81 | 1830 | 430 | 2.7 |
| 1.0 | 84 | 1400 | 260 | 5.7 |
| 1.5 | 78 | 1100 | 150 | 4.3 |
| 3.0 | 66 | 225 | 250 | 2.3 |

EXAMPLE VII

This example demonstrates that mechanical properties of films formed from dispersions of vermiculite lamellae can be improved by employing low shearing action to maximize platelet delamination, followed by shearing with a known device.

Example V is repeated except that a paddle stirrer is used for 0 hours, one-half hour and 4 hours, respectively, before switching to the cowles blade. The data shows that mechanical properties of the film are improved compared to the use of the cowles blade alone. The results are summarized below:

| Paddle Stirrer (hrs.) | Particle Size Conversion to Less than 38 Microns (%) | Tensile (psi) | Film Modulus (kpsi) | Elongation (%) |
|---|---|---|---|---|
| 0 | 70 | 1570 | 300 | 4.3 |
| 0.5 | 71 | 2140 | 470 | 4.0 |
| 4.0 | 76 | 2610 | 400 | 4.5 |

What I claim and desire to protect by Letters Patent is:

1. A process for the production of an aqueous dispersion of vermiculite ore particles comprising the steps of:
   (a) contacting vermiculite ore with an aqueous sodium salt solution followed by an aqueous washing therein producing an aqueous suspension of vermiculite ore particles, and then
   (b) swelling and delaminating the vermiculite ore particles in one step by contacting the particles in aqueous suspension from step (a) with an aqueous organo substituted ammonium-cation solution wherein the ratio of organo substituted ammonium-cations to exchangeable sodium ions in the aqueous suspension of ore particles from step (a) is less than about 3.5:1 and greater than about 0.1:1, while simultaneously subjecting the suspension to a shearing action.

2. The process of claim 1 wherein the shearing action is applied for a time necessary to achieve a dispersion containing particles having an aspect ratio of at least 10 and a particle size of less than 200 microns.

3. The process of claim 1 wherein the shearing action is applied for a time necessary to achieve a dispersion containing particles having an aspect ratio of at least 100 and a particle size of less than 50 microns.

4. The process of claim 1 wherein the shearing action is applied for a time necessary to achieve a dispersion containing particles having an aspect ratio of at least 1,000 and a particle size of less than 50 microns.

5. The process of claim 1 step (b) wherein the ratio of organo substituted ammonium-cations to exchangeable sodium ions in the aqueous suspension of vermiculite ore particles from step (a) is from about 1:1 to about 0.2:1.

6. The process of claim 1 wherein the source of organo substituted ammonium-cation contains an inert anion which will not decompose during delamination.

7. The process of claim 6 wherein the inert anion is chloride ion.

8. The process of claim 1 wherein step (a) is conducted using suspensions having a concentration of vermiculite ore in the range from about 1% to about 70%.

9. The process of claim 1 wherein the source of organo substituted ammonium-cation is allyl-ammonium chloride.

10. The process of claim 1 wherein the source of organo substituted ammonium-cation is propyl-ammonium chloride.

11. The process of claim 1, step (b) wherein a low shearing action is initially applied followed by a subsequent step of higher shearing action application.

12. A process for the preparation of films and coatings from aqueous dispersions of vermiculite ore particles comprising the steps of:
   (a) contacting vermiculite ore with an aqueous sodium salt solution followed by an aqueous washing therein producing an aqueous suspension of vermiculite ore particles, then
   (b) swelling and delaminating the vermiculite ore particles in one step by contacting the particles in aqueous suspension from step (a) with an aqueous organo substituted ammonium-cation solution wherein the ratio of organo substituted ammonium-cations to exchangeable sodium ions in the aqueous dispersion of ore particles from step (a) is less than about 3.5:1 and greater than about 0.1:1, while simultaneously subjecting the suspension to a shearing action to produce a dispersion of vermiculite lamellae, and
   (c) depositing the vermiculite lamellae on a surface and removing water from the vermiculite particles.

13. The process of claim 12 step (b) wherein the ratio of organo substituted ammonium-cations to exchangeable sodium ions in the aqueous suspension of vermiculite ore particles from step (a) is from about 1:1 to about 0.2:1.

14. A process for the production of an aqueous dispersion of montmorillonite particles comprising the steps of:
(a) contacting the montmorillonite particles with an aqueous Na+salt solution followed by an aqueous washing, therein producing an aqueous suspension of montmorillonite particles, and then
(b) swelling and delaminating the montmorillonite particles in one step by contacting the particles in aqueous suspension from step (a) with an aqueous organo substituted ammonium-cation solution wherein the ratio of organo substituted ammonium-cations to exchangeable Na+ions in the aqueous suspension of particles from step (a) is less than about 3.5:1 and greater than 0.1:1, while simultaneously subjecting the suspension to a shearing action.

* * * * *

UNITED STATES PATENT AND TRADEMARK OFFICE
CERTIFICATE OF CORRECTION

PATENT NO. : 4,812,260
DATED : March 14, 1989
INVENTOR(S) : Lawrence L. Nelson

It is certified that error appears in the above-identified patent and that said Letters Patent is hereby corrected as shown below:

Column 5, line 27;

"10%"    should read   --20%--

Column 5, line 56;

"fim"    should read   --film-- .

Signed and Sealed this

First Day of August, 1989

Attest:

Attesting Officer

DONALD J. QUIGG

Commissioner of Patents and Trademarks